(12) United States Patent
Brunel et al.

(10) Patent No.: US 11,330,318 B2
(45) Date of Patent: May 10, 2022

(54) METHOD FOR MANAGING AN ELECTRONIC DEVICE

(71) Applicant: Orange, Issy-les-Moulineaux (FR)

(72) Inventors: Laurent Jean Brunel, Chatillon (FR); Isabelle Athias, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/361,949

(22) Filed: Mar. 22, 2019

(65) Prior Publication Data
US 2019/0306554 A1    Oct. 3, 2019

(30) Foreign Application Priority Data

Mar. 30, 2018 (FR) ...................... 1852829

(51) Int. Cl.
| | |
|---|---|
| *H04N 21/41* | (2011.01) |
| *H04N 21/414* | (2011.01) |
| *H04N 21/442* | (2011.01) |
| *H04L 12/28* | (2006.01) |

(52) U.S. Cl.
CPC ..... *H04N 21/4126* (2013.01); *H04L 12/2825* (2013.01); *H04L 12/2827* (2013.01); *H04N 21/41407* (2013.01); *H04N 21/44218* (2013.01); *H04N 21/4131* (2013.01)

(58) Field of Classification Search
CPC ................................................. H04N 21/4131
See application file for complete search history.

(56) References Cited

U.S. PATENT DOCUMENTS

| | | |
|---|---|---|
| 2002/0130834 A1 | 9/2002 | Madarasz et al. |
| 2006/0164255 A1* | 7/2006 | Humbert .............. G05B 19/048 340/679 |
| 2013/0040561 A1* | 2/2013 | Conde e Silva ........ H04W 4/80 455/41.1 |
| 2014/0040033 A1* | 2/2014 | Lueken .............. G06Q 30/0261 705/14.58 |
| 2014/0087660 A1* | 3/2014 | Kim ...................... H04L 12/282 455/41.1 |
| 2014/0108677 A1 | 4/2014 | Yamada |
| 2015/0131810 A1* | 5/2015 | Kim ...................... H04R 1/028 381/77 |
| 2016/0111091 A1* | 4/2016 | Bakish .................... G10L 15/30 704/275 |

(Continued)

FOREIGN PATENT DOCUMENTS

| | | |
|---|---|---|
| EP | 2661019 A2 | 11/2013 |
| WO | 2017055715 A1 | 4/2017 |

OTHER PUBLICATIONS

French Search Report dated Sep. 18, 2018 for corresponding French Application No. 1852829, filed Mar. 30, 2018.

(Continued)

*Primary Examiner* — Michael H Hong
(74) *Attorney, Agent, or Firm* — David D. Brush; Westman, Champlin & Koehler, P.A.

(57) ABSTRACT

A method for managing a device able to communicate with at least one terminal of a user. The terminal is able to process and render data associated with the device via a rendering application. The method includes the following steps on the device: transmitting, to the terminal, a command to activate the data rendering application; and transmitting the data to the terminal.

10 Claims, 3 Drawing Sheets

(56) References Cited

U.S. PATENT DOCUMENTS

2016/0226676 A1     8/2016   Shin et al.
2017/0175317 A1*   6/2017   Kim ........................ D06F 33/32
2018/0158460 A1*   6/2018   Lee ........................ H05B 47/12
2018/0322773 A1    11/2018   Brunel et al.
2018/0338258 A1* 11/2018   Dill ........................ G06Q 20/36

OTHER PUBLICATIONS

English translation of the French Written Opinion dated Sep. 18, 2018 for corresponding French Application No. 1852829, filed Mar. 30, 2018.

\* cited by examiner

METHOD FOR MANAGING AN ELECTRONIC DEVICE

TECHNICAL FIELD

The present invention relates to the field of electronics. More particularly, the present invention relates to the interoperability of electronic devices to enable one electronic device to benefit from the functionalities of another electronic device, in this case called a terminal, having a means for rendering data for a user.

PRIOR ART

Some electronic devices, such as for example home gateways (or boxes'), digital decoders (or 'set top boxes') and connected home appliances (refrigerators, electric radiators, etc.), have a small screen, or do not have one. It is therefore difficult to know their internal data (state, capabilities, control modes, etc.) and to interact with them in order to control them.

There are solutions and associated standards for transferring a user interface of a device to a terminal in the context of the local area network. For example, the RVU (for "Remote view") protocol, based on the UPnP (from the English "Universal Plug and Play") and DLNA (from the English "Digital Living Network Alliance") standards, which standards make it possible to share audiovisual content between the content servers and the terminals of a home network, provides technical specifications that enable an accurate rendering of the user interfaces on the various devices of the network. Document US 2014/0108677 A1 describes for example a system in which a terminal of a local area network is able to connect to a master device so as to receive a description of the device via a local area network protocol (UPnP).

However, as the desired aim of these solutions is to transfer the display of the device for the purpose of a monitoring, rendering or remote control operation (for example to control the radiators, or the box, from outside the household, view audiovisual content on a PC, etc.), the mobile terminal and the device generally communicate via a communication network (local area network and/or wide area network). However, some apparatuses are not connected to a communication network (for example a refrigerator having "smart" capabilities may or may not be connected to the household's local area network). For other apparatuses, although they are connected to the communication network (for example via a home gateway), it is not always desirable to control them or to acquire their internal data via this network, in particular for reasons of simplicity: controlling a device on the local area network assumes knowing about it (via, for example, a discovery step).

In addition, this type of solution, which is highly distributed, often exhibits interoperability problems.

According to another example, application US 2002/0130834 describes a method allowing a user to control electronic devices via a terminal, for example a PC, equipped with a screen. The electronic devices are shown schematically on the screen of the terminal; when the user selects a device, its interface data are transmitted to the terminal and displayed on its screen by a simulation program, so as to allow the user to control the device. Such a system requires a step of discovering the devices in order to be able to offer them to the user. This type of solution may exhibit interoperability problems between the devices. In addition, the choice of the apparatus to be controlled is made on the terminal, this involving intelligence (dedicated programs, etc.) and an additional load on this terminal, and also a certain complexity for the user, who has to perform a certain number of cumbersome operations himself. This terminal-oriented approach is not always desirable.

It is also known to obtain such data automatically via a point-to-point wireless link. Application WO2017055715 describes a method for the local management of an electronic device by a terminal, wherein the internal data of the device are received automatically by the terminal when said terminal enters within the range of the device. This solution exhibits the drawback of potential false detection if the user unintentionally brings his terminal close to the device. To mitigate this problem, the applicant proposes, in one embodiment, to detect an intentional movement of the user. However, analysis of this intentional movement assumes the introduction of specific (hardware or software) intelligence on the part of the mobile and/or of the device, and sometimes remains difficult to detect reliably.

The invention offers a solution that does not exhibit the drawbacks of the prior art.

THE INVENTION

To this end, according to one functional aspect, one subject of the invention is a method for managing a device able to communicate with at least one terminal of a user, the terminal being able to process and render data associated with the device via a rendering application, the method being implemented by a processor, the method including the following steps on the device:

transmitting, to the terminal, a command to activate the data rendering application;

transmitting said data to said terminal.

Mobile terminals (smartphones, tablets, etc.) are nowadays equipped with a processor and with convenient rendering capabilities; they may advantageously be used to render, for example display, data originating from another device.

Data associated with the electronic device are understood to mean all of the information in relation to the configuration, the state, the statistics and more generally all of the usage data of the device, accessible to the device. In particular, these data relate to user interface data, that is to say data that are rendered to the user for the purpose of making him aware of information (configuration, state, etc.) and, where applicable, communicating with the device and making changes to some of these parameterizable data. In this case, this may indiscriminately involve a text interface (using semi-graphic characters to display the menus, the dialog boxes, messages or any other element intended for the user), a graphical interface (for which the items to be manipulated are shown in the form of icons on which the user is able to emulate physical manipulations), a web interface (a graphical interface of a web application, manipulated by way of a web browser), or else a voice interface, etc.

These data associated with the device, which will hereinafter be called "user interface data" without loss of generality, may be stored in any memory of the device (RAM or ROM internal memory, external memory on the network or a USB key, etc.). Advantageously, the invention offers the advantage of activating an application on the terminal, from the device, so as to automatically display the interface data on the terminal.

Thus, according to the invention, it is the device that takes the initiative of launching the application of the terminal and of sending to it information that appears to be relevant thereto; the intelligence, that is to say the choice of the data to be transmitted, therefore remains on the part of the device. Advantageously, it is thus possible to use the same application for all of the devices, and the terminal behaves passively.

The invention also allows device manufacturers to avoid putting screens with limited capability on or close to the devices, thereby leading to a reduction in the production costs and the environmental impact of the device, while at the same time offering a better experience for the user, who uses a high-performance terminal that is available to him (smartphone, tablet, PC, TV, etc.).

According to one particular mode of implementation of the invention, a management method such as described above is furthermore characterized in that the step of transmitting said data is preceded by a step of establishing a point-to-point communication session with the terminal in order to transmit the data.

This mode of implementation of the invention makes it possible to ensure reliable management of the device: the point-to-point communication limits the knowledge of the exchanged data to the electronic device and to the terminal. Advantageously, the device does not need to be connected to a local area network. Advantageously again, the data are not necessarily transmitted on a communication network, but only exchanged between the two apparatuses (terminal and device). The data exchanged over the point-to-point session are thus not able to be intercepted by another device, which device may for example be spying on the local area network.

According to another particular mode of implementation of the invention, a management method such as described above is furthermore characterized in that the step of transmitting said data is preceded by a step of connecting the device and the terminal to one and the same local area network used to transmit the data.

This mode of implementation of the invention makes it possible to ensure simple management of the communication between the device and the terminal. Specifically, if the two appliances are already connected, via a service gateway (box) to the same local area network, the data may be exchanged on this local area network without another step of establishing communication between the two appliances. The data may simply be "pushed" to the target terminal of the local area network, which is known to the electronic device and/or to its gateway, or broadcast to a plurality of terminals.

According to another particular mode of implementation of the invention, a management method such as described above is furthermore characterized in that the step of transmitting an activation command is preceded by a step of obtaining a request to transmit data associated with the device, said request resulting from an interaction between the user and the device.

Advantageously, this embodiment thus offers the advantage of transferring a user interface onto such a mobile terminal (e.g. a smartphone) by simply performing an action on the device, this action leading to the application on the terminal being awoken. It will moreover be noted that:
  In the context of the invention, there is no need for the device to be connected to the local area network. Advantageously, the user thus dispenses with a discovery step, since it suffices for said user to perform an action on the device. In addition, the terminal and the device may be disconnected, while the invention is being implemented, from any communication network.
  There is also no need for the terminal to be situated close to the device. It is possible for example to contemplate a tablet or a television screen positioned in a room and able to render the user interface data of all of the appliances in this room. It will suffice for the user to perform an action on the device in order for its interface to be transferred to the tablet and/or the television.

According to another particular mode of implementation of the invention, which may be implemented in addition or as an alternative to the preceding ones, the method is characterized in that said interaction is an action on an actuator of the device.

"Actuator" is understood to mean any part of the device that makes it possible to convert the received power into useful work for executing the task of detecting an action on the device: button, actuator, magnet, speaker, thermometer, etc.

Advantageously according to this mode, a simple action of the user, for example pressing a button of the device, bringing a magnet close, etc. may trigger preparation of the interface data. Numerous devices are already equipped with such buttons (for example a box comprises a certain number of buttons on the cover) and therefore do not require any change in terms of hardware.

According to another particular mode of implementation of the invention, which may be implemented in addition or as an alternative to the preceding ones, the method is characterized in that said interaction is detection of presence of the user by a sensor of the device.

Advantageously according to this mode, the simple fact that the user approaches the device may trigger the preparation of the interface data by activating a sensor (motion sensor, presence sensor, etc.). This may avoid said user for example having to free up part of his body in order to press a button.

According to another particular mode of implementation of the invention, which may be implemented in addition or as an alternative to the preceding ones, the method is characterized in that said interaction is connection to a connector of the device.

Advantageously according to this mode, the simple fact that the user connects a cable, dongle, etc. to a connector (or port) of the device, which is provided for this purpose, may trigger the preparation of the interface data. Such a connector may or may not be dedicated for this purpose. It may be a USB port of the device, for example. Two variants may be adopted:
  either the user inserts a key, dongle, cable, etc. into the USB port and thereby triggers sending of the data to a terminal, for example using Wi-Fi.
  or the user connects a cable linked to a terminal, and thereby triggers sending of the data to this terminal.

According to another particular mode of implementation of the invention, which may be implemented in addition or as an alternative to the preceding ones, the method is characterized in that said interaction is recognition of an audio signature on the device.

Advantageously according to this mode, the simple fact that the user utters a voice command, or claps his hands, clicks his tongue, etc. may trigger the preparation of the interface data after recognition of the audio signal thus generated by a module (microphone, etc.) of the device.

According to another functional aspect, the invention also relates a method for processing data associated with a device able to communicate with at least one terminal of a user, the terminal being able to process and render said data via a data processing application, the method being implemented by a processor and including the following steps on the terminal:

receiving a command to activate the data rendering application;

rendering said data.

"Activation" is understood in this case to mean launching the application if said application is not currently running on the terminal, and/or bringing to the foreground the application that has already started (activated) in the background. Advantageously, the method according to this functional aspect brings to the foreground the interface processing application, which therefore takes the "focus", which will allow the user to become aware of the data and to be able to interact with the device.

According to one hardware aspect, the invention also relates to an electronic device able to communicate with at least one terminal able to process and render data associated with the device via a rendering application, including:

a module for transmitting, to the terminal, a command to activate the data rendering application;

a module for transmitting said data to said terminal.

The term module may correspond equally to a software component or to a hardware component or to a set of software and hardware components, a software component itself corresponding to one or more computer programs or subroutines or, more generally, to any element of a program able to implement a function or a set of functions such as described for the modules in question. In the same manner, a hardware component corresponds to any element of a hardware assembly able to implement a function or a set of functions for the module in question (integrated circuit, chip card, memory card, etc.).

According to another hardware aspect, the invention also relates to a home gateway including an electronic device such as described above.

According to another hardware aspect, the invention also relates to a terminal for processing data associated with a device, including the following modules:

a module for receiving a command to activate a the data rendering application;

a module for obtaining said data from the device.

According to yet another hardware aspect, the invention relates to a system comprising an electronic device such as described above and at least one terminal such as described above.

According to another hardware aspect, the invention also relates to a computer program able to be implemented for the management method such as described above, the program comprising code instructions that perform the steps of the management method when the program is executed by a processor of the electronic device.

According to another hardware aspect, the invention also relates to a computer program able to be implemented for the processing method such as described above, the program comprising code instructions that perform the steps of the processing method when the program is executed by a processor of the electronic device.

This processing device and this computer program have features and advantages that are analogous to those described above in relation to the method for managing an electronic device.

According to yet another hardware aspect, the invention pertains to a recording medium able to be read by a data processor and on which there is recorded a program comprising program code instructions for the execution of the steps of a method such as defined above.

The invention will be better understood on reading the following description, given by way of example and with reference to the appended drawings.

THE FIGURES

DETAILED DESCRIPTION OF AN EXEMPLARY EMBODIMENT ILLUSTRATING THE INVENTION

The invention relates to the management of user data of any device by a terminal. User data, in the broad sense, are understood to mean all of the internal data of the device. Hereinafter, human-machine interface is shortened to the term HMI. Terminal is in this case understood to mean any electronic appliance able to receive an interface, for example a graphical interface, and to render it for a user, so as to allow the user to become aware of the data of the device and possibly interact on the device, for example configure it. Household appliance is understood in this case to mean any device that enables a user to interact via an HMI (home gateway, STB, washing machine, refrigerator, etc.), in particular appliances that do not have a screen large enough to display the required data.

Figure 1:
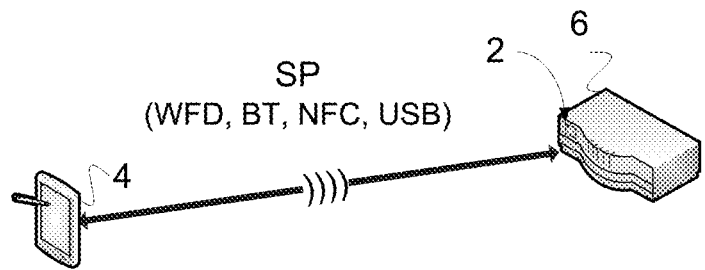
FIG. 1 illustrates an example of an implementation environment according to one particular embodiment of the invention.

FIG. 1 illustrates an example of an implementation environment according to one particular embodiment of the invention. Such an environment comprises in particular an electronic device (6) and a terminal (4). According to this embodiment, the electronic device is for example a service gateway (6), the terminal is a smartphone (4), and the user interface (IHM) to be transferred onto the terminal is an interface for managing the gateway.

The user wants to receive the HMI data of the device on his terminal. To this end, he performs an action on the device, so as to request that the interface be rendered on his terminal. According to one example, he presses a button of the device. According to other examples, he may trigger recognition of an audio signature (voice, hand clap, etc.) on the device, touch it, brush it, trigger a sensor through his presence, connect a connector to a port of the device (USB serial port, Ethernet port, telephone port, etc.), transmit a command to it from another appliance of the network, etc. According to another example, a specific port (for example a USB port) may be dedicated to the transfer of the interface data and the detection triggered by connecting a terminal to this dedicated port.

The device optionally checks that it is connected to the terminal, that is to say that it is able to exchange data therewith. If this is not the case, the device may optionally request to establish a communication session with the terminal.

According to one embodiment, the device and the terminal are connected to the local area network (LAN), in which case the checking step may be omitted.

According to another embodiment, the device is not connected to the local area network (LAN), in which case a request may be transmitted to the terminal so as to implement the hardware and software means necessary to establish communication.

Communication is established between the mobile terminal and the electronic device: the communication, also called "session" hereinafter, symbolized by the double-headed arrow (SP), is performed in bidirectional point-to-point mode in this example. It may be based for example on various radio technologies and various protocols:

- communication in what is termed "ad-hoc" mode between two appliances provided with a Wi-Fi function. In "ad-hoc" mode, also called "Wi-Fi Direct" (WFD) mode, and in contrast to "infrastructure" mode, the wireless devices connect to one another so as to form point-to-point (or "peer-to-peer") links, that is to say a network in which each device performs, at the same time, the role of client and the role of server, or access point. "Wi-Fi Direct" mode, also called Wi-Fi P2P (Peer to Peer) mode, is a technology developed by the "Wi-Fi Alliance" consortium that enables sharing of data between various peripheral devices (computers, TVs, mobiles, etc.) via their Wi-Fi connection without an intermediate Wi-Fi access point (router, gateway, etc.). For example, according to this embodiment, the terminal is configured so as to be put into Wi-Fi mode (termed "Hotspot", that is to say that it positions itself as a Wi-Fi access point). The electronic device, the Wi-Fi module of which is also active, detects its presence and puts itself into "Wi-Fi direct", thus opening a session between the two devices. This embodiment affords the advantage of enabling the exchange of data via a secure channel. Wi-Fi technology is indeed generally well known to those skilled in the art for its capabilities of affording good security on the channel if said technology is configured judiciously. It is robust, reliable and fast.
- Bluetooth (BT) communication; Bluetooth technology is a short-distance radio technology intended to simplify connections between electronic apparatuses and developed by the "Bluetooth SIG" association. It is particularly widespread and useful for establishing a point-to-point connection between apparatuses that are close. It is very simple to use, consumes little energy and is nevertheless secure.
- near field communication, for example of NFC (Near Field Communication) type; these communications, based mainly on the ISO (International Organization for Standardization) 14443 standard, use wireless technologies to enable an exchange of information between two peripheral devices separated by a short distance, typically of less than ten centimeters.
- wired communication, for example via a USB cable or Ethernet cable, etc.

As an alternative, this channel may be established by any of the means within the scope of those skilled in the art, whether these be wired or wireless. Mention may be made for example of infrared (RF), the Zigbee protocol (a protocol that enables communication in local area networks, on a radio link, with reduced consumption), the "DECT Ultra Low Energy" standard (DECT ULE for short, an extension of DECT for low-energy applications), or else the "Bluetooth Low Energy" standard (BLE for short), the aim of which is to supply a reduced power in comparison with the standard applications of the Bluetooth standard, the LTE (Long Term Evolution) protocol, etc.

As this type of communication between the two devices is private, given that it is established point-to-point, it exhibits a certain number of advantages, in particular in terms of security, but above all it is not necessary for the appliances to be connected to a network.

According to another embodiment, the communication may use a local area network to which the two appliances are connected. In this case, the communication is not strictly "point-to-point", but remains established between a transmitter (the device) and a receiver (the terminal).

According to one variant, this channel may be established in broadcast or multicast mode: the device may easily broadcast its HMI to a plurality of terminals of the local area network.

According to another variant, this channel may be established in multiple mode: a plurality of devices (actuated by the user) may broadcast their HMI to a terminal of the local area network, for example a television screen, whose screen would be divided so as to allow rendering of a plurality of HMIs from a plurality of devices.

When the session is established, the electronic device may transmit the data in relation to its HMI. The mobile terminal receives the data, activates the application, displays the interface for a user and awaits a possible command from said user (lower the temperature, change the configuration of the gateway, etc.).

At the end of the communication session, an explicit or implicit disconnection may take place. The disconnection is for example explicit in the case of a prior Wi-Fi link, as the electronic device is not able to connect both to the mobile terminal in point-to-point in "Wi-Fi Ad-Hoc" mode and to a service gateway in "Wi-Fi infrastructure" mode. It is therefore preferable to disconnect it. The disconnection is optional in the case of Bluetooth. The disconnection of two Bluetooth devices is generally implicit (if the two apparatuses move apart by a range greater than the maximum range permitted by the standard). It is also optional in the case of NFC, as the electromagnetic field decreases with distance, naturally ending the communication when the terminal is no longer within the range of the device.

Figure 2:
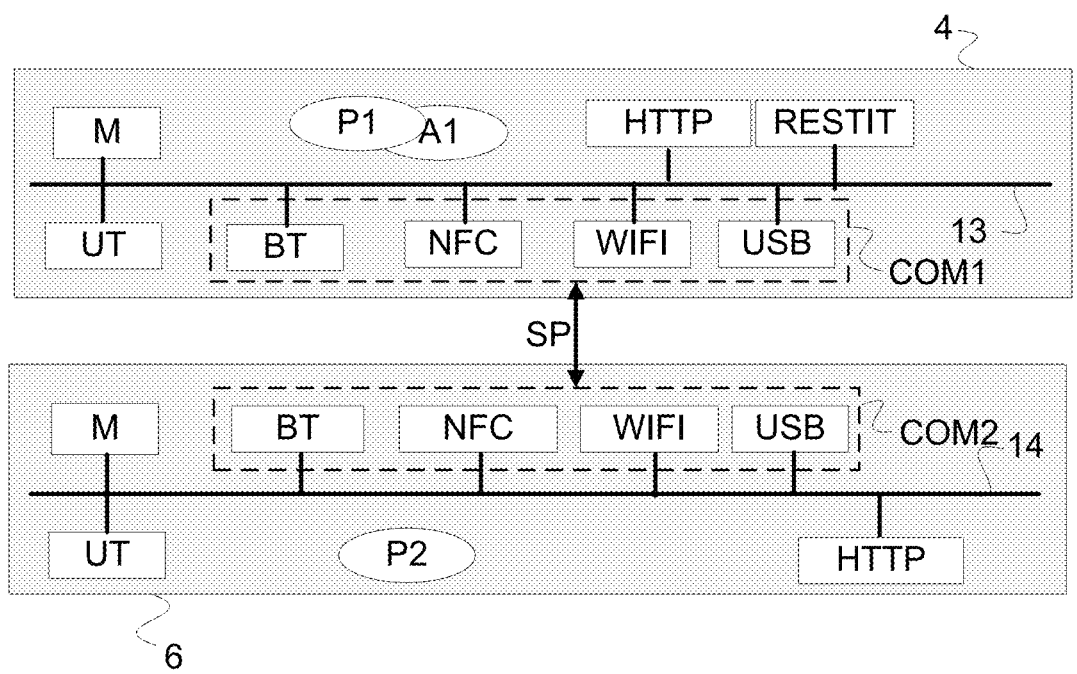
FIG. 2 shows a hardware architecture of an electronic device and of a mobile terminal according to one embodiment.

FIG. 2 shows a hardware architecture of an electronic device controlled by a mobile terminal and of said mobile terminal according to one embodiment.

The terminal (4) comprises, as is conventional, memories M articulated around a processing unit (UT), which comprises for example a processor (CPU, DSP, etc.). The memories may be of ROM (Read Only Memory) or RAM (Random Access Memory) type, removable or fixed, etc. The random access memory makes it possible to store, in the short term, computing data used when implementing a method according to some embodiments. The non-volatile memory (for example of EEPROM type) makes it possible to store for example a computer program according to one embodiment for execution thereof by a processor. It communicates with the electronic device (6) via a communication module (COM1) that allows it to connect via a radio channel of Wi-Fi, Bluetooth (BT), NFC or else Zigbee (not shown), etc. type or a physical link. As described beforehand with reference to FIG. 1, a communication channel (SP) is established between the two devices (4) and (6) according to this example. As an alternative, it is possible to contemplate multipoint communication from the device to a plurality of terminals. The terminal also includes, according to this example, a communication module of HTTP type for providing communications of HTTP type, for example of WebSocket (WS) type; it will be noted that communication of WS type is possible on a Bluetooth link. It will also be noted that this module is optional and given here only by way of indication.

The module P1, which may be a software and/or hardware module, is in particular capable of performing the actions that will be described with reference to FIG. 3, that is to say sending requests and commands to the electronic device and processing the user interface data, in accordance with methods according to some embodiments.

The application module A1, which may be a software and/or hardware module, is in particular capable of receiving a command from the device and of launching, if necessary, the management application P1 upon reception of this command. It may or may not be integrated into the application P1.

The terminal furthermore includes a user interface, such as for example a keypad (not shown), for receiving commands from a user, and a rendering unit, RESTIT (screen, display, speakers, etc.) for rendering the user interface of the electronic device.

All of these modules communicate with one another, as is conventional, via a data bus (13).

The electronic device (6) also comprises memories M articulated around a processing unit (UT), which comprises for example a processor (CPU, DSP, etc.). It connects to the mobile terminal via the link SP in Wi-Fi or Bluetooth, wired, etc. mode via its communication module COM2, which is able to communicate with the module COM1 described above.

It also includes a module (P2) responsible for processing information: obtaining information in relation to an action of the user on the device, establishing communication with the mobile terminal, receiving control commands or rendering requests from the mobile terminal, preparing (formatting, encoding, etc.) the user interface data, transmitting the user interface to the terminal, etc.

It also possibly includes a communication module of HTTP type.

All of the modules communicate with one another, as is conventional, via a data bus (14).

Figure 3:
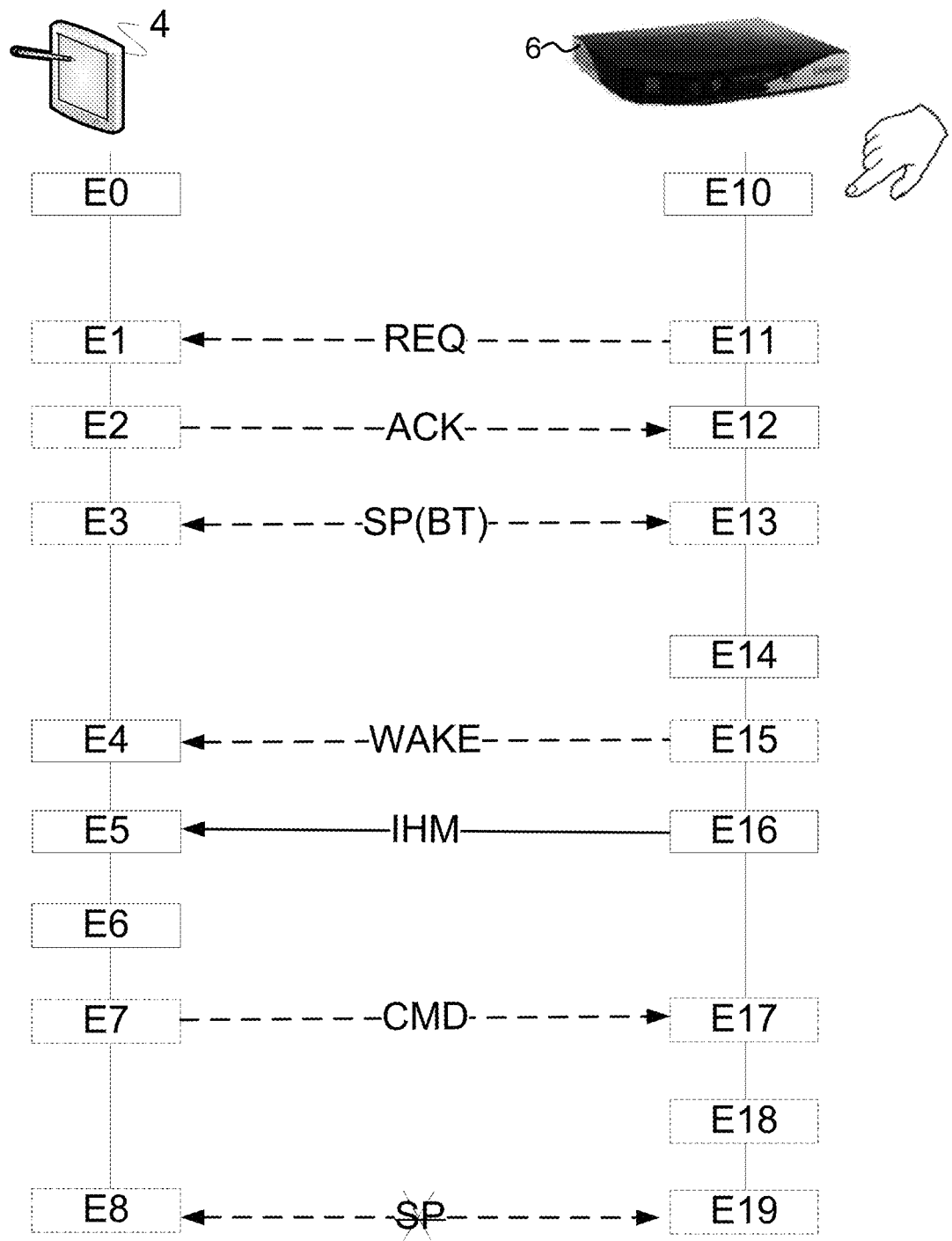
FIG. 3 shows a flow chart illustrating the various steps of the method on the electronic device and on the mobile terminal controlling said electronic device, according to one embodiment.

FIG. 3 shows a flow chart illustrating the various steps of the method according to one embodiment on the electronic device (6) and a corresponding exemplary method on the mobile terminal (4).

It is recalled that the aim of the steps is to transmit the user interface (HMI) of the device to the terminal following an action of the user, for example pressing a button of the device.

The electronic device is called upon by the user in step E10. For example, the user presses a button of the device.

An optional step E11 allows the device to transmit a connection request (REQ) to the terminal. This request is useful for establishing dedicated communication between the terminal and the device. It is optional insofar as the two devices may already be connected and able to communicate with one another, in particular if they are both connected to the local area network. The terminal may possibly acknowledge the received request in a step E2. This step may serve in particular for mutual authentication of the two devices or any other security operation.

In the following step E13 (respectively E3 for the terminal), a communication session (SP) is established between the two entities. According to a few examples, the channel used for the communication is of NFC, Wi-Fi, Bluetooth, Li-Fi (data transmission technology using an LED appliance), USB, etc. type. The communication may be established in point-to-point between the terminal and the device via an ad-hoc mechanism (Bluetooth, Wi-Fi ad-hoc, LTE radio link, physical cable, etc.) or via the local area network if the device and the terminal are connected thereto. In both cases, this involves communication between a transmitter (the device) and a single receiver (the terminal). According to one variant, the communication is established in broadcast or multicast mode. For example, all of the terminals of the local area network could receive a request to manage the interface of the device on which the action (pressing a button) has been performed.

In a step E14, the electronic device obtains and prepares the user interface data, for example the graphical interface data. Any means within the scope of those skilled in the art may be contemplated, in particular reading a memory of the device or preparing the graphical interface from basic data.

The data of the user interface (IHM) may be encoded by way of a markup language (XML, HTML) using semantics tailored to the description of the elements of the user interface, before being transmitted to the terminal. This makes it possible simply to transmit, to the terminal, data that are easily able to be displayed, for example in the form of XML/HTML, etc. language. Data of this type are able to be interpreted by most existing standards. It is also easier to adapt, with this kind of data, to the capabilities of the terminal.

The user interface data may be tailored depending on the capabilities of the terminal. This mode of implementation makes it possible to tailor the data of the graphical interface to the capabilities of the terminal that will render said data, for example in terms of the display: if the terminal has a large screen, it is able to display more information that is comprehensible to the user. If, by contrast, the terminal has a small screen, it is beneficial to send to said terminal minimal data to display. Such a tailoring method is well known to those skilled in the art, for example in the specifications of the aforementioned RVU standard. The capabilities of the terminal may for example be transmitted by said terminal to the device in the step of establishing the communication session.

In a step E15, the electronic device transmits, to the terminal, a command to activate the data rendering application (P2).

The program A1 receives the command to activate the terminal. The program A1 is either a program for delegation to a third-party application, in this case called P1, in which case A1 determines the application (P1) of the terminal to which the command corresponds, or the program P1 responsible for the processing itself.

It will be noted that this program A1 may be part of the operating system (OS) of the terminal or a dedicated program running on this OS.

Next, a command originating from A1 activates and brings to the foreground, where applicable, the application P1 on the terminal. "Where applicable" is understood to mean that, if the application is already active in the background, the command causes it to transition to the foreground. If by contrast the application has not yet been activated (or started), it has to be launched (or activated, or started) conventionally, and then brought to the foreground.

An application in the foreground has for example an active display window that is able to be viewed and with which the user is easily able to interact. In other words, the application in the foreground "takes the focus". It is capable of rendering the interface data and recovering the actions of the user on the mobile (text input, pressing buttons, lists, etc.).

This application P1 may be native or take the form of a browser. A native application is an application specifically designed to run on a particular user peripheral device operating system (Android, Ios, etc.) and firmware (low-level software). Native applications therefore differ from the applications provided by the browser, which for their part require elements or instructions downloaded from a web server each time they are started or provided. The applications based on a browser and the resources provided by the browser may be processed by any web-compatible terminals in the browser, and are therefore not specific to the operating system.

The activation step may include a sub-step of sending an item of identity data of the terminal for the purpose of identifying and/or authenticating the terminal (and thus confirming access of the terminal to the device).

The data of the interface are then transmitted to the terminal in a step E16. The terminal receives said data in a step E5; it then processes these data in a step E6 and renders them: in this example, it displays the graphical interface on its screen (RESTIT). According to one variant, this may be a web interface, a voice interface rendered via a speaker, etc. The data may be transferred in accordance with various protocols and formats that are either standard (of HTTP and XML type) or proprietary, with all possible abstraction levels, possibly ranging as far as sending data in a buffer ("frame buffer") in raw form.

For example, the application is a browser and receives a web page in HTML format, consisting of buttons, lists, graphical elements, etc. with which the user is able to interact.

The processing unit of the terminal optionally transmits one or more items of data (commands, information, etc.) during a step E7 (CMD) via its communication module. The processing module of the device receives the item of data (E17) and carries out processing operations to convert it into an effective action on the device (store a new parameter value, lower the temperature, change the configuration of the box, reduce the speed of a motor, etc.) in a step E18.

Once the user interface has been received and exploited by the user, the point-to-point session (SP) may optionally be closed again in a step E19 (respectively E8 on the terminal). Closing the session enables the two devices to be able to exit point-to-point mode in order for example to establish another session.

Figure 4A:
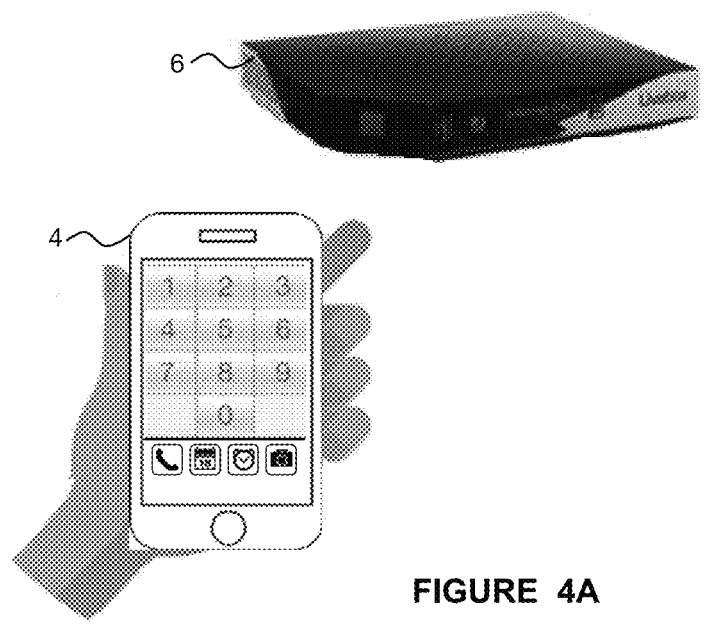
FIGS. 4A and 4B illustrate an implementation of the invention on a "Livebox" device.
Figure 4B:
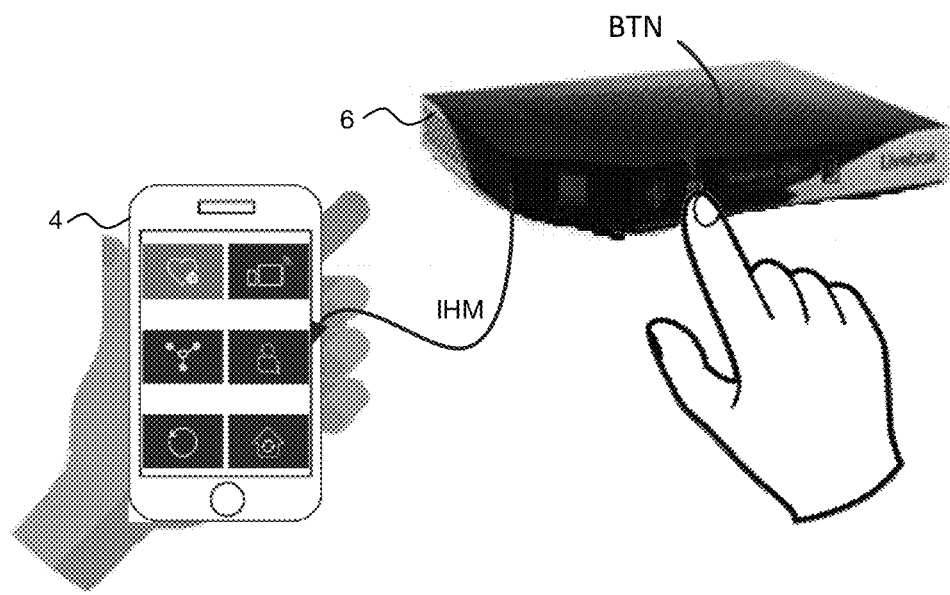

FIGS. 4A and 4B illustrate an implementation of the invention on a "box" device.

In FIG. 4A, the user of the smartphone 4, which he is holding in his hand in this example, wants to recover information from the box 6 (state, programs, configuration, etc.). His smartphone has a screen that displays any application (in this case a digital keypad).

In FIG. 4B, he presses a button BTN of the box (for example the "info" button available on the front cover of the Livebox from the operator Orange). Said Livebox then transmits interface data to the terminal, which brings to the foreground the interface after having possibly activated/brought to the foreground the interface processing application. The user is then able to interact with one of the applications offered on the screen (icons of FIG. 4*b* on the screen of the terminal 4) so as to become aware of the state of his box, communicate data or commands to it, etc.

It goes without saying that the embodiment that has been described above has been given purely by way of wholly non-limiting indication, and that numerous modifications may easily be made by those skilled in the art without, however, departing from the scope of the invention.

The invention claimed is:

1. A method for managing a device able to communicate with at least one terminal of a user, the terminal being able to process and render data associated with the device via a rendering application, the method being implemented by a processor, the method including the following steps performed on or by the device:
    obtaining a request to transmit to the terminal the data associated with the device, said request resulting from the user performing an action on an actuator of the device;
    transmitting, to the terminal, a command commanding at least one of launching the data rendering application if said data rendering application is not currently running on the terminal or bringing to a foreground of the terminal the data rendering application if said data rendering application has been already activated;
    after transmitting the command, receiving an item of identity data of the terminal for the purpose of identifying the terminal, said receiving being implemented in response to either the launching the data rendering application or bringing to a foreground of the terminal the data rendering application, in the terminal; and
    after receiving the item of identity data, transmitting said data associated with the device to said terminal in response to the request to transmit data associated with the device.

2. The method as claimed in claim 1, wherein the step of transmitting said data is preceded by a step of establishing a point-to-point communication session with the terminal in order to transmit the data.

3. The method as claimed in claim 1, wherein the step of transmitting said data is preceded by a step of connecting the device and the terminal to one and the same local area network used to transmit the data.

4. The method as claimed in claim 1, wherein the request to transmit to the terminal the data associated with the device results from the user triggering a sensor of the device through the user's presence by the sensor.

5. The method as claimed in claim 1, wherein the request to transmit to the terminal the data associated with the device results from the user connecting the terminal to a specific port of the device, dedicated to transfer of interface data from the device to the terminal.

6. The method as claimed in claim 1, wherein said request to transmit to the terminal the data associated with the device results from recognition of an audio signature on the device.

7. A method for processing data associated with a device able to communicate with at least one terminal of a user, the terminal being able to process and render said data via a data processing application, the method being implemented by a processor and including the following steps on or by the terminal:
    receiving a command commanding at least one of launching the data rendering application if said data rendering application is not currently running on the terminal or bringing to a foreground of the terminal the data rendering application if said data rendering application has been already activated;
    after receiving the command, transmitting an item of identity data of the terminal for the purpose of identifying the terminal, said transmitting being implemented in response to either the launching the data rendering application or bringing to a foreground of the terminal the data rendering application, in the terminal;
    after transmitting the item of identity data, obtaining said data from the device, said data being obtained in response to a request to transmit to the terminal data associated with the device, said request resulting from the user performing an action on an actuator of the device; and rendering said data.

8. An electronic device able to communicate with at least one terminal able to process and render data associated with the device via a rendering application, including:

a processor; and a non-transitory computer-readable medium comprising instructions stored thereon, which when executed by the processor configure the electronic device to perform acts comprising:

obtaining a request to transmit to the terminal the data associated with the device, said request resulting from the user performing an action on an actuator of the device;

transmitting, to the terminal, a command commanding at least one of launching the data rendering application if said data rendering application is not currently running on the terminal or bringing to a foreground of the terminal the data rendering application if said data rendering application has been already activated;

after transmitting the command, receiving an item of identity data of the terminal for the purpose of identifying the terminal, said receiving being implemented in response to either the launching the data rendering application or bringing to a foreground of the terminal the data rendering application, in the terminal; and after receiving the item of identity data, transmitting said data associated with the device to said terminal in response to the request to transmit the data associated with the device.

9. The electronic device as claimed in claim 8, wherein the device is comprised in a home gateway.

10. A terminal for processing data associated with a device, comprising:

a processor; and a non-transitory computer-readable medium comprising instructions stored thereon, which when executed by the processor configure the terminal to perform acts comprising:

receiving a command commanding at least one of launching the data rendering application if said data rendering application is not currently running on the terminal or bringing to a foreground of the terminal the data rendering application if said data rendering application has been already activated;

after receiving the command, transmitting an item of identity data of the terminal for the purpose of identifying the terminal, said transmitting being implemented in response to either the launching the data rendering application or bringing to a foreground of the terminal the data rendering application, in the terminal;

after transmitting the item of identity data, obtaining said data associated with a device from the device, said data being obtained in response to a request to transmit to the terminal data associated with the device, said request resulting from the user performing an action on an actuator of the device; and rendering said data.

* * * * *